United States Patent
Kang et al.

(10) Patent No.: US 12,415,941 B2
(45) Date of Patent: Sep. 16, 2025

(54) RESIN COMPOSITION FOR TACKIFIER OR ADHESIVE AND PREPARATION METHOD THEREOF

(71) Applicant: HANWHA SOLUTIONS CORPORATION, Seoul (KR)

(72) Inventors: Hyeon Uk Kang, Daejeon (KR); Do Hyun Byun, Daejeon (KR); Ying Zhang, Daejeon (KR); Pilje Seong, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 696 days.

(21) Appl. No.: 17/765,393

(22) PCT Filed: Mar. 19, 2020

(86) PCT No.: PCT/KR2020/003754
§ 371 (c)(1),
(2) Date: Mar. 30, 2022

(87) PCT Pub. No.: WO2021/066267
PCT Pub. Date: Apr. 8, 2021

(65) Prior Publication Data
US 2022/0356379 A1   Nov. 10, 2022

(30) Foreign Application Priority Data
Oct. 2, 2019 (KR) .................. 10-2019-0122167

(51) Int. Cl.
| | | |
|---|---|---|
| *C09J 123/06* | (2006.01) | |
| *C08F 212/08* | (2006.01) | |
| *C08L 23/04* | (2006.01) | |
| *C09J 5/06* | (2006.01) | |
| *C09J 11/08* | (2006.01) | |
| *C09J 125/08* | (2006.01) | |
| *C09J 145/00* | (2006.01) | |

(52) U.S. Cl.
CPC .......... *C09J 123/06* (2013.01); *C08F 212/08* (2013.01); *C08L 23/04* (2013.01); *C09J 5/06* (2013.01); *C09J 11/08* (2013.01); *C09J 125/08* (2013.01); *C09J 145/00* (2013.01); *C09J 2423/00* (2013.01); *C09J 2425/00* (2013.01)

(58) Field of Classification Search
CPC ...... C09J 123/06; C09J 123/08; C09J 123/10; C09J 145/00; C09J 157/02; C08L 23/06; C08L 23/08; C08L 23/10
See application file for complete search history.

(56) References Cited

U.S. PATENT DOCUMENTS

| | | | |
|---|---|---|---|
| 12,110,424 B2* | 10/2024 | Fujii | C09J 191/06 |
| 2018/0186903 A1* | 7/2018 | Lee | C09J 133/062 |
| 2019/0309114 A1* | 10/2019 | Kang | C08F 2/001 |
| 2023/0235203 A1* | 7/2023 | Okazaki | C08L 53/02 |
| | | | 442/381 |

FOREIGN PATENT DOCUMENTS

| | | | | |
|---|---|---|---|---|
| CN | 105111968 A | 12/2015 | | |
| EP | 3578617 A1 * | 12/2019 | | B32B 27/00 |
| JP | 2004026903 A | 1/2004 | | |
| JP | 20040515618 A | 5/2004 | | |
| JP | 2016155916 A | 9/2016 | | |
| JP | 2017031273 A | 2/2017 | | |
| KR | 1019960014182 A | 5/1996 | | |
| KR | 1020160138391 A | 12/2016 | | |
| KR | 1020180067404 A | 6/2018 | | |
| KR | 102559986 B1 * | 7/2023 | | B32B 27/32 |
| WO | 2018110918 A1 | 6/2018 | | |
| WO | WO 2018/110918 * | 6/2018 | | |
| WO | WO 2020/027222 A1 * | 2/2020 | | |

OTHER PUBLICATIONS

Machine translation of JP 2017-031273 (no date).*
Machine translation of KR 10-2559986 (no date).*
2019 China Hot-Melt Adhesives Forum, Hilton Jinan South Hotel & Residences, Mar. 19-21, 2019.

* cited by examiner

*Primary Examiner* — Marc S Zimmer
(74) *Attorney, Agent, or Firm* — Harvest IP Law, LLP

(57) ABSTRACT

Provided are a resin composition for a tackifier or an adhesive and a preparation method thereof. Provided is a resin composition for a tackifier or an adhesive, which includes a hydrogenated petroleum resin with a controlled hydrogenation rate to have excellent compatibility with polyolefin and to exhibit high transparency while having improved quality including adhesive property.

8 Claims, No Drawings

RESIN COMPOSITION FOR TACKIFIER OR ADHESIVE AND PREPARATION METHOD THEREOF

BACKGROUND OF THE INVENTION

(a) Field of the Invention

Cross-Reference to Related Application

This application is a National Stage of International Application No. PCT/KR2020/003754 filed Mar. 19, 2020, which claims priority from, Korean Patent Application No. 10-2019-0122167, filed on Oct. 2, 2019, the disclosure of which is hereby incorporated by reference herein in its entirety.

The present invention relates to a resin composition for a tackifier or an adhesive, and a preparation method thereof.

(b) Description of the Related Art

A dicyclopentadiene (DCPD) resin, which is a resin prepared by thermal polymerization, is mixed with various polymers such as amorphous polyalphaolefin (APAO), ethylenevinyl acetate (EVA), styrenic block copolymers (SBCs), etc. to be used as a tackifier resin for a tackifier/adhesive. In this case, various physical properties are required depending on the type and use of the tackifier/adhesive. In order to satisfy these requirements, research and development for improving a compatibility with polymers and adhesive strength have been actively conducted.

Meanwhile, in the recent hot melt adhesive (HMA) field, there is an increasing demand for polyolefin-based hot melt adhesives, instead of traditional ethylene vinyl acetate (EVA)-based hot melt adhesives widely used. Polyolefin has a wide range of applications and advantages in processing, because polyolefin has excellent thermal stability, low brittleness, and low melt viscosity, as compared to EVA.

A hot melt adhesive generally consists of a polymer as a base, a tackifier, a wax, and an antioxidant. The polymer imparts mechanical properties such as strength of the adhesive, and the tackifier is compatible with the polymer to lower the melt viscosity of the hot melt and provides wettability and initial adhesive strength.

Accordingly, in order for a polyolefin-based hot melt adhesive to exhibit high performance, the effect as a tackifier must be sufficiently expressed based on its high compatibility with polyolefin.

SUMMARY OF THE INVENTION

In order to solve the above problems, there are provided a resin composition for a tackifier or an adhesive, which may include a hydrogenated petroleum resin with a controlled hydrogenation rate, thereby having excellent compatibility when mixed with a polyolefin, and exhibiting good adhesive strength and high transparency, and a preparation method thereof.

To achieve the above object, according to one embodiment of the present invention, provided is a resin composition for a tackifier or an adhesive, the resin composition including:
a hydrogenated petroleum resin obtained by performing thermal polymerization and hydrogenation of a monomer composition including dicyclopentadiene and C9 monomer; and
a metallocene polyolefin,
wherein the hydrogenated petroleum resin has a hydrogenation rate of 90% to 100%, as measured by the following Equation 1:

Hydrogenation rate (%)=Number of moles of saturated aliphatic single bonds in aromatic double bonds of hydrogenated petroleum resin after hydrogenation/Number of moles of total aromatic double bonds in petroleum resin before hydrogenation*100    [Equation 1]

Further, according to another embodiment of the present invention, provided is a method of preparing a resin composition for a tackifier or an adhesive, the method including the steps of:
preparing a polymerized petroleum resin by performing thermal polymerization of a monomer composition including dicyclopentadiene and C9 monomer;
preparing a hydrogenated petroleum resin having a hydrogenation rate of 90% to 100%, as measured by the following Equation 1, by performing hydrogenation of the polymerized petroleum resin; and
mixing the hydrogenated petroleum resin and a metallocene polyolefin.

Hydrogenation rate (%)=Number of moles of saturated aliphatic single bonds in aromatic double bonds of hydrogenated petroleum resin after hydrogenation/Number of moles of total aromatic double bonds in petroleum resin before hydrogenation*100    [Equation 1]

According to a resin composition for a tackifier or an adhesive of the present invention, when a hydrogenated petroleum resin with a controlled hydrogenation rate is mixed with a polyolefin, the resin composition may exhibit excellent compatibility, and good adhesive strength and high transparency.

Further, the resin composition for a tackifier or an adhesive of the present invention may be used as a polyolefin-based hot melt adhesive, and may exhibit excellent thermal stability, low brittleness, and low melt viscosity, as compared with traditional EVA hot melt adhesives. Thus, the resin composition is advantageous in processing and may have a wider range of applications.

Further, according to a method of preparing a resin composition for a tackifier or an adhesive of the present invention, when thermal polymerization is performed by mixing dicyclopentadiene and C9 monomer, and then hydrogenation is performed to control a hydrogenation rate, followed by mixing with a polyolefin, it is possible to prepare a resin composition for a tackifier or an adhesive having excellent compatibility and exhibiting good adhesive strength and high transparency.

Further, the resin composition for a tackifier or an adhesive of the present invention may provide a tackifier with improved physical properties by optimizing properties of the hydrogenated petroleum resin depending on the type of the polyolefin.

Further, the thermal polymerization of dicyclopentadiene and C9 monomer is performed by dividing into two stages: in a first stage of the polymerization, continuous monomer mixing and reaction are performed, and in a second stage of the polymerization, the polymerization is continued while suppressing a crosslinking reaction, thereby preparing a resin exhibiting high productivity and a lower molecular weight and a narrower molecular weight distribution than traditional petroleum resins.

DETAILED DESCRIPTION OF THE EMBODIMENTS

As used herein, the term 'petroleum resin' or 'polymerized petroleum resin' refers to a resin polymerized using dicyclopentadiene and C9 monomer as monomers. A resin obtained by performing hydrogenation, i.e., hydrogen addition reaction of the petroleum resin is referred to as a hydrogenated petroleum resin.

Further, as used herein, the term 'hydrogenation' or 'hydrogen addition reaction' refers to a reaction whereby hydrogens are added to aromatic double bonds to be converted to aliphatic single bonds.

Further, as used herein, the term 'tackifier or adhesive' is used to encompass both a tackifier and an adhesive.

In the present invention, the terms "the first", "the second" and the like are used to describe a variety of components, and these terms are merely employed to differentiate one component from other components.

The terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, steps, components, or combinations thereof, and do not exclude the existence or the possibility of addition of one or more different characteristics, steps, components or combinations thereof beforehand.

The present invention may be variously modified and have various forms, and specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

Hereinafter, a resin composition for a tackifier or an adhesive of the present invention and a preparation method thereof will be described in more detail.

A resin composition for a tackifier or an adhesive according to one embodiment of the present invention is characterized by including a hydrogenated petroleum resin obtained by performing thermal polymerization and hydrogenation of a monomer composition including dicyclopentadiene and C9 monomer; and a metallocene polyolefin, wherein the hydrogenated petroleum resin has a hydrogenation rate of 90% to 100%, as measured by the following Equation 1:

Hydrogenation rate (%)=Number of moles of saturated aliphatic single bonds in aromatic double bonds of hydrogenated petroleum resin after hydrogenation/Number of moles of total aromatic double bonds in petroleum resin before hydrogenation*100      [Equation 1]

A method of preparing a resin composition for a tackifier or an adhesive according to another embodiment of the present invention includes the steps of preparing a polymerized petroleum resin by performing thermal polymerization of a monomer composition including dicyclopentadiene and C9 monomer; preparing a hydrogenated petroleum resin having a hydrogenation rate of 90% to 100%, as measured by the following Equation 1, by performing hydrogenation of the polymerized petroleum resin; and mixing the hydrogenated petroleum resin and a metallocene polyolefin.

Hydrogenation rate (%)=Number of moles of saturated aliphatic single bonds in aromatic double bonds of hydrogenated petroleum resin after hydrogenation/Number of moles of total aromatic double bonds in petroleum resin before hydrogenation*100      [Equation 1]

A DCPD resin obtained by polymerizing dicyclopentadiene (DCPD) is mixed with a variety of polymers, and widely used as a tackifier resin for a tackifier/adhesive. In this regard, various physical properties are required depending on the type and use of the tackifier/adhesive, and a resin copolymerized with an aromatic olefin-based comonomer compound as a comonomer has been proposed to improve compatibility with polymers and improve adhesive strength.

Korean Patent Publication No. 2018-0067404 discloses a method of preparing a dicyclopentadiene-based resin by performing a two-stage polymerization on a monomer composition including dicyclopentadiene and an aromatic olefin-based comonomer at a weight ratio of 90:10 to 10:90, wherein hydrogenation may be performed on the dicyclopentadiene-based resin polymerized by the above preparation method.

However, the patent does not disclose specific conditions for the hydrogenation of the DCPD resin or a hydrogenation rate, and does not disclose an adhesive in which the hydrogenated DCPD resin is mixed with a metallocene polyolefin.

Accordingly, the present inventors controlled the hydrogenation rate of the petroleum resin obtained by thermal polymerization of dicyclopentadiene and C9 monomer to 90% to 100%, or 95% to 100%. They found that when the hydrogenated petroleum resin showing such a high hydrogenation rate is mixed with a metallocene polyolefin, it is possible to provide a high-quality tackifier or adhesive exhibiting good compatibility, adhesive strength, and high transparency, thereby completing the present invention.

The C9 monomer, which is a raw material in a petroleum fraction produced by naphtha thermal cracking, means an unsaturated aromatic C8, C9, or C10 monomer, or a mixture thereof. For example, the C9 monomer may include styrene, alpha-methyl styrene, vinyl toluene, indene, or alkylated derivatives thereof, etc.

According to one embodiment of the present invention, the monomer composition may include dicyclopentadiene and C9 monomer at a weight ratio of 95:5 to 10:90. More specifically, the monomer composition may include dicyclopentadiene and C9 monomer at a weight ratio of 95:5 to 10:90, or 90:10 to 10:90, preferably 90:10 to 40:60, and more preferably 90:10 to 60:40. When the amount of dicyclopentadiene is relatively too large, the effect of improving quality of the resin may be insignificant. On the contrary, when the amount of C9 monomer is relatively too large, the polymerization reactivity may be lowered and the cost of the hydrogenation process may be increased. In this point of view, the above-mentioned range of the weight ratio may be preferred.

Meanwhile, the optimal weight ratio of dicyclopentadiene and C9 monomer may vary depending on the type of metallocene polyolefin. In other words, depending on whether they are mixed with a polyethylene-based polyolefin or a polypropylene-based polyolefin, the weight ratio of the C9 monomer suitable for achieving high transparency may vary.

More specifically, when used as a tackifier for a polyethylene-based polyolefin, the C9 monomer may be included in an amount of 40 wt % or less, based on the total weight of the dicyclopentadiene and C9 monomer, which may be more preferred in terms of achieving high transparency. For example, when the amount of C9 monomer is 5 wt % or more, or 10 wt % or more, and 40 wt % or less, or 35 wt % or less, or 30 wt % or less, the resin composition including the C9 monomer and the polyethylene-based polyolefin may exhibit excellent light transmittance.

Meanwhile, when used as a tackifier for a polypropylene-based polyolefin, the C9 monomer may be included in an amount of 30 wt % or more, based on the total weight of the dicyclopentadiene and C9 monomer, which may be more preferred in terms of achieving high transparency. For example, when the amount of C9 monomer is 30 wt % or more, or 35 wt % or more, or 40 wt % or more, and 60 wt % or less, or 55 wt % or less, or 50 wt % or less, the resin composition including the C9 monomer and the polypropylene-based polyolefin may exhibit excellent light transmittance.

The monomer composition including dicyclopentadiene and C9 monomer at such a weight ratio is subjected to thermal polymerization to prepare a polymerized petroleum resin.

The thermal polymerization may be performed by a first polymerization stage of performing a polymerization process of the monomer composition under stirring; and a second polymerization stage of performing a polymerization process of the reaction product of the first stage polymerization without stirring.

The petroleum resin obtained through these two-stage polymerization reaction has a relatively narrow molecular weight distribution, as compared to the traditional petroleum resins including the same amount of C9 monomer, thereby exhibiting excellent adhesive strength while maintaining high compatibility.

More specifically, in the first polymerization stage, a first polymerization is performed with addition and mixing of the monomer composition until the conversion rate of dicyclopentadiene reaches a predetermined level. Subsequently, in the second polymerization stage, a second polymerization is performed without stirring on the reaction product of the first polymerization stage. Side reactions, such as generation of homopolymers, etc., may be suppressed, and thus a high-quality polymerized petroleum resin with a narrow molecular weight distribution may be obtained. In other words, in the first polymerization stage, side reactions such as polystyrene production, etc. are suppressed through effective mixing of the polymerization raw materials, and in the second polymerization stage, the reaction rate is increased to suppress the overall side reaction, and to increase the reaction rate of dicyclopentadiene and C9 monomer.

In addition, it is possible to obtain a polymerized petroleum resin with a low molecular weight and molecular weight distribution because the crosslinking reaction is suppressed while including the high content of C9 monomer.

According to one embodiment of the present invention, in the first polymerization stage, the polymerization process may be performed on the monomer composition at a reaction temperature ($t_1$) of 210° C. to 270° C.

The monomer composition may be used in a state of being dissolved in a solvent. As the solvent, those commonly used in the art to which the present invention pertains may be used. For example, a solvent such as pentane, hexane, heptane, nonane, decane, benzene, toluene, or xylene may be used, but the present invention is not limited thereto.

In addition, the monomer composition may further include additives commonly used in the art to which the present invention pertains, such as an antioxidant, a polymerization inhibitor.

The first polymerization stage is performed at a reaction temperature ($t_1$) of 210° C. to 270° C. while stirring the monomer composition.

According to one embodiment of the present invention, the first polymerization stage may be performed in a continuous stirred tank reactor (CSTR). CSTR is one of continuous reactors and has advantages that it is possible to continuously inject reactants, to provide a mixing effect during reaction, to keep the temperature constant during reaction, and to lower the probability of local hot spots. However, CSTR has disadvantages that a conversion rate of the reactants per reactor volume is low, and the molecular weight distribution of the resin is broadened due to the remaining polymer not discharged within a residence time.

Further, a plug flow reactor (PFR), which is another continuous reactor, has advantages that the reactor has no stirrer, and thus maintenance and management of the reactor is relatively easy, and a conversion rate per reactor volume is high. However, the reactor has disadvantages that it is difficult to control the temperature in the reactor, and when the reaction is exothermic, there is high probability of local hot spots.

According to one embodiment of the present invention, the thermal polymerization may be carried out in two stages, and the first polymerization stage may be carried out in CSTR and the second polymerization stage described below may be carried out in PFR. Through each stage of the polymerization, it is possible to prepare the high-quality petroleum resin by inhibiting broadening of the molecular weight distribution while maintaining high productivity.

The CSTR used in the first polymerization stage may be any CSTR commonly used in the art to which the present invention pertains, and polymerization may be performed while continuously injecting and mixing the monomer composition.

According to one embodiment of the present invention, the reaction temperature ($t_1$) of the first polymerization stage may be controlled from 210° C. to 270° C. or from 220° C. to 270° C.

When the reaction temperature is too low, the reaction may not sufficiently occur, and when the reaction temperature is too high, side reactions such as crosslinking reaction, etc. may be generated. In this point of view, the reaction temperature is preferably controlled within the above-described range.

Further, a reaction pressure of the first polymerization stage may be 1 bar to 40 bar, or 5 bar to 35 bar, or 10 bar to 30 bar. When the reaction pressure is too low, the reactivity may be lowered by vaporized monomers, and when the reaction pressure is too high, there is a high risk of accident during operation. In this point of view, the reaction pressure is preferably controlled within the above-described range.

Further, a reaction time of the first polymerization stage may be 10 minutes to 90 minutes, or 20 minutes to 80 minutes, or 30 minutes to 70 minutes. When the reaction time is too short, inhibition of side reactions by mixing of the raw materials may be unsatisfactory, and when the reaction time is too long, productivity of the final resin is decreased, and the molecular weight distribution may be broadened. In this point of view, the reaction time is preferably controlled within the above-described range.

The first polymerization stage may be carried out until the conversion rate of dicyclopentadiene included in the monomer composition reaches 5% to 70%, or 10% to 60%, or 15% to 50%. The conversion rate of dicyclopentadiene may be calculated as a percentage of the consumption amount to the injection amount of the dicyclopentadiene per unit time, and may be determined by measuring a dry weight of the produced resin relative to the weight of the injected raw materials.

When the conversion rate of dicyclopentadiene in the first polymerization stage is too low, the subsequent second polymerization stage may be burdened and a resin having a sufficient polymerization degree may not be produced. When the conversion rate is too high, the molecular weight and the molecular weight distribution of the petroleum resin may be greatly increased, which is undesirable. In this point of view, the first polymerization stage may be carried out only until the conversion rate of dicyclopentadiene reaches the above-described range.

Next, the reaction products of the first polymerization stage may be subjected to the second polymerization in a separate reactor which is connected to the reactor used in the first polymerization stage.

According to one embodiment of the present invention, the second polymerization may be carried out in a plug flow reactor (PFR). The PFR may be connected to CSTR where the first polymerization stage is carried out. Accordingly, the reaction products of the first polymerization stage may be injected into PFR, and thus continuous polymerization may occur.

As described above, PFR is a reactor having no internal stirrer, and has an advantage that the conversion rate of the monomer per volume of the reactor is high. However, stirring is insufficient, and thus there is probability of generation of local hot spots and side reaction caused thereby.

However, in the present invention, the polymerization of the monomer composition is not carried out from the beginning in PFR, but the reaction products polymerized at a predetermined polymerization degree through the first polymerization stage are subjected to the second polymerization stage. Therefore, due to reduction in the heat of polymerization reaction, generation of local hot spots may be prevented, and as a result, the dicyclopentadiene resin having a narrow molecular weight distribution may be prepared.

The PFR used in the second polymerization may be any PFR commonly used in the art to which the present invention pertains. In the PFR, polymerization may be carried out while being continuously provided with the reaction products of the first polymerization.

According to one embodiment of the present invention, a reaction temperature ($t_2$) of the second polymerization may be in the range of the reaction temperature ($t_1$) of the first polymerization ±30° C., i.e., in the range of $t_1$−30° C. to $t_1$+30° C., or $t_1$−25° C. to $t_1$+25° C., or $t_1$−20 to $t_1$+20° C.

The reaction temperature ($t_2$) of the second polymerization may be determined within the above range, thereby inhibiting side reactions and obtaining the effect of high productivity. In other words, when the difference between $t_2$ and $t_1$ is too large, productivity may be lowered. Therefore, the difference between $t_2$ and $t_1$ is preferably controlled within the above-described range.

More preferably, the reaction temperature ($t_2$) of the second polymerization may be controlled in the range from $t_1$ to $t_1$+20° C., or from $t_1$ to $t_1$+15° C. When the reaction temperature of the second polymerization is controlled as above, production of unreacted oligomers is minimized, thereby obtaining the petroleum resin having a high softening point and a narrow molecular weight distribution.

Further, the reaction pressure of the second polymerization may be 1 bar to 40 bar, or 5 bar to 35 bar, or 10 bar to 30 bar. When the reaction pressure is too low, generation of a dead zone or change of a residence time may occur due to vaporized monomers. When the reaction pressure is too high, a safety issue may arise in the process. In this point of view, the reaction pressure is preferably controlled within the above-described range.

Further, the reaction time of the second polymerization may be 1 to 4 times, 1 to 3 times, or 1 to 2 times the reaction time of the first polymerization. When the reaction time is too short, as compared with the reaction time of the first polymerization, the reaction may not occur sufficiently, and when the reaction time is too long, side reactions may occur. In this point of view, the reaction time is preferably controlled within the above-described range.

Further, an internal volume of the PFR used in the second polymerization may be 1 to 3 times, or 1 to 2.5 times, or 1 to 2 times an internal volume of the CSTR used in the first polymerization. When the internal volume of the PFR is too small, as compared with the internal volume of the CSTR, the polymerization may not occur sufficiently in the PFR, and as a result, a large amount of impurities such as wax may remain therein. When the internal volume of the PFR is too large, as compared with the internal volume of the CSTR, the effects obtained by using the CSTR reactor are unsatisfactory, and control of the initial reaction heat is insufficient, and thus it is difficult to control the reaction temperature. In this point of view, the internal volume of PFR is preferably controlled within the above-described range.

According to the preparation method of the present invention, relatively high yield of about 50% or more, or about 60% or more, or about 65% or more may be achieved despite the relatively short reaction time, and the polymerized petroleum resin having the narrow molecular weight distribution may also be obtained.

Further, the polymerized petroleum resin may have a Z-average molecular weight (Mz) of 100 g/mol to 5,000 g/mol, or 300 g/mol to 4,500 g/mol, or 500 g/mol to 4,000 g/mol.

Further, the polymerized petroleum resin may have a weight average molecular weight (Mw) of 100 g/mol to 3,000 g/mol, or 200 g/mol to 2,500 g/mol, or 300 g/mol to 2,000 g/mol.

Further, the polymerized petroleum resin may have a number average molecular weight (Mn) of 100 g/mol to 1,200 g/mol, or 150 g/mol to 1,000 g/mol, or 200 g/mol to 800 g/mol.

Further, the polymerized petroleum resin may have a molecular weight distribution (PDI, Mw/Mn) of 2.5 or less, more specifically, 1.0 or more, or 1.2 or more, or 1.4 or more, and 2.5 or less, or 2.4 or less, or 2.2 or less, or 1.8 or less.

Owing these characteristics, the polymerized petroleum resin may be mixed with a metallocene polyolefin to provide a hot melt adhesive/sticking agent showing excellent adhesive strength.

Next, the polymerized petroleum resin obtained by the above-described method may be subjected to a hydrogenation reaction.

The hydrogen addition reaction or hydrogenation reaction refers to a reaction whereby aromatic double bonds present in the petroleum resin are saturated by adding hydrogens to be converted to aliphatic single bonds.

According to one embodiment of the present invention, the hydrogenation may be performed by injecting the polymerized petroleum resin into a fixed bed reactor packed with a hydrogenation catalyst. For example, the hydrogenation may be performed under conditions of a reaction temperature of about 250° C., a reaction pressure of about 100 bar, a raw material flow rate of about 40 ml/min, and a hydrogen flow rate of about 4 NLPM, but the present invention is not limited thereto.

According to one embodiment of the present invention, the hydrogenation may be performed twice or more. More specifically, the hydrogenation may be performed twice or more, for example, twice, three times, or four times to control the hydrogenation rate.

The hydrogenated petroleum resin obtained by performing the hydrogenation as above is characterized by having a hydrogenation rate of 90% to 100%, as measured by the following Equation 1:

Hydrogenation rate (%)=Number of moles of saturated aliphatic single bonds in aromatic double bonds of hydrogenated petroleum resin after hydrogenation/Number of moles of total aromatic double bonds in petroleum resin before hydrogenation*100 [Equation 1]

In Equation 1, the number of moles of the aromatic double bonds and the aliphatic single bonds is measured using $^1$H-NMR, and is determined as a ratio (area, %) of each bond, when a structure of a compound to be measured is measured by $^1$H-NMR.

In other words, the hydrogenation reaction may be performed until the hydrogenation rate measured by Equation 1 reaches 90% to 100% by adjusting the reaction temperature, reaction pressure, number of reactions, and the like.

More specifically, the hydrogenated petroleum resin may have a hydrogenation rate of 90% or more, as measured by Equation 1. When the hydrogenation rate is less than 90%, the hydrogenated petroleum resin may not exhibit sufficient compatibility with a polyolefin and transparency, when it is mixed with the polyolefin. A higher hydrogenation rate is more preferable, and thus the upper limit is 100%. However, considering the process efficiency of the hydrogenation reaction, a sufficient effect may be achieved even with a hydrogenation rate of 98% or less.

A resin composition for a tackifier or an adhesive is prepared by mixing the hydrogenated petroleum resin obtained as above with a metallocene polyolefin.

The metallocene polyolefin refers to a polyolefin obtained by (co)polymerizing olefinic monomers such as ethylene, propylene, butene, octene, hexene, etc. using a metallocene catalyst. The type of the metallocene catalyst is not particularly limited, and any metallocene catalyst is used without limitation, as long as it may be used as a base resin for a tackifier or an adhesive.

According to one embodiment of the present invention, the hydrogenated petroleum resin and the metallocene polyolefin may be included at a weight ratio of 90:10 to 10:90. More specifically, the hydrogenated petroleum resin and the metallocene polyolefin may be included at a weight ratio of 80:20 to 20:80, more preferably, at a weight ratio of 60:40 to 40:60. When the amount of the hydrogenated petroleum resin is relatively too large, the mechanical strength of the adhesive may decrease or the brittle property may excessively increase. On the contrary, when the amount of the metallocene polyolefin is relatively too large, the melt viscosity is high, and thus the processability may reduce or the adhesive strength may be poor. In this point of view, the above-mentioned range of the weight ratio may be preferred.

According to one embodiment of the present invention, the metallocene polyolefin may be a polyethylene(PE)-based polyolefin or a polypropylene(PP)-based polyolefin.

The method of mixing the hydrogenated petroleum resin with the metallocene polyolefin is not particularly limited, and they may be mixed by a common method in the art to which the present invention pertains.

The resin composition for a tackifier or an adhesive as described above may exhibit excellent light transmittance. On the other hand, with regard to the light transmittance of the resin composition for a tackifier or an adhesive, conditions for achieving high transparency may vary depending on the type of the metallocene polyolefin. In other words, it was confirmed that, depending on whether it is mixed with a PE-based polyolefin or a PP-based polyolefin, the weight ratio of the C9 monomer, which is included in the petroleum resin, suitable for achieving high transparency and the hydrogenation rate of the petroleum resin may vary.

More specifically, when the resin composition of the present invention is used as a tackifier for PE-based polyolefin, the content of C9 monomer is 40 wt % or less, for example, 5 wt % to 40 wt %, based on the total weight of dicyclopentadiene and C9 monomer in the hydrogenated petroleum resin. When the hydrogenation rate of the hydrogenated petroleum resin is 90% or more, the light transmittance is 85% or more, indicating excellent light transmittance.

In contrast, when the resin composition of the present invention is used as a tackifier for a PP-based polyolefin, the content of C9 monomer is 30 wt % or more, for example, 30 wt % to 60 wt %, based on the total weight of dicyclopentadiene and C9 monomer in the hydrogenated petroleum resin. When the hydrogenation rate of the hydrogenated petroleum resin is 95% or more, the light transmittance is 88% or more, indicating excellent light transmittance.

Meanwhile, higher transmittance is more preferable, and thus the upper limit is not particularly limited, but the transmittance may be 95% or less.

As described above, according to the present invention, when the hydrogenated petroleum resin with the controlled weight ratio of the C9 monomer in the petroleum resin and the controlled hydrogenation rate is mixed with a polyolefin, it is possible to prepare a resin composition for a tackifier or an adhesive, which exhibits excellent compatibility and adhesive strength and high transparency, and a preparation method thereof.

Hereinafter, the action and effect of the present invention will be described in more detail with reference to specific exemplary embodiments of the present invention. However, these exemplary embodiments are provided only for illustrating the present invention, and the scope of the present invention is not limited thereto.

EXAMPLE

Preparation Example of Hydrogenated Petroleum Resin

Preparation Example 1

A monomer composition was prepared by mixing 1350 g of dicyclopentadiene and 150 g of styrene in 1500 g of a xylene solvent.

While the monomer composition was continuously fed into a CSTR (internal volume: 0.416 L), a first polymerization stage (reaction time: 42 minutes) was performed under conditions of a temperature of 260° C. and a pressure of 25 bar.

While reaction products of the first polymerization stage were continuously fed into a PFR (internal volume: 0.590 L) connected to the CSTR, a second polymerization stage (reaction time: 63 minutes) was performed under conditions of a temperature of 278° C. and a pressure of 25 bar.

After completion of the polymerization, a product was depressurized at 200° C. for 30 minutes to recover a polymerized petroleum resin.

The polymerized petroleum resin was fed into a fixed bed reactor with a length of 1.5 m, which was packed with a heterogeneous palladium catalyst (0.5%), and hydrogenation was performed under conditions of a reaction temperature of 250° C., a reaction pressure of 100 bar, a raw material flow rate of 40 ml/min, and a hydrogen flow rate of 4 NLPM to prepare a hydrogenated petroleum resin.

Preparation Example 2

A hydrogenated petroleum resin was prepared in the same manner as in Preparation Example 1, except that hydrogenation was performed a total of twice by further performing the hydrogenation once in Preparation Example 1.

Preparation Example 3

A hydrogenated petroleum resin was prepared in the same manner as in Preparation Example 1, except that hydrogenation was performed a total of three times by further performing the hydrogenation twice in Preparation Example 1.

Preparation Example 4

A monomer composition was prepared by mixing 1050 g of dicyclopentadiene and 450 g of styrene in 1500 g of a xylene solvent.

While the monomer composition was continuously fed into a CSTR (internal volume: 0.416 L), a first polymerization stage (reaction time: 48 minutes) was performed under conditions of a temperature of 260° C. and a pressure of 25 bar.

While reaction products of the first polymerization stage were continuously fed into a PFR (internal volume: 0.590 L) connected to the CSTR, a second polymerization stage (reaction time: 72 minutes) was performed under conditions of a temperature of 281° C. and a pressure of 25 bar.

After completion of the polymerization, a product was depressurized at 200° C. for 30 minutes to recover a polymerized petroleum resin.

The polymerized petroleum resin was fed into a fixed bed reactor with a length of 1.5 m, which was packed with a heterogeneous palladium catalyst (0.5%), and hydrogenation was performed twice under conditions of a reaction temperature of 250° C., a reaction pressure of 100 bar, a raw material flow rate of 40 ml/min, and a hydrogen flow rate of 4 NLPM to prepare a hydrogenated petroleum resin.

Preparation Example 5

A hydrogenated petroleum resin was prepared in the same manner as in Preparation Example 4, except that hydrogenation was performed a total of three times by further performing the hydrogenation once in Preparation Example 4.

Preparation Example 6

A monomer composition was prepared by mixing 1080 g of dicyclopentadiene and 720 g of styrene in 1200 g of a xylene solvent.

While the monomer composition was continuously fed into a CSTR (internal volume: 0.416 L), a first polymerization stage (reaction time: 48 minutes) was performed under conditions of a temperature of 260° C. and a pressure of 25 bar.

While reaction products of the first polymerization stage were continuously fed into a PFR (internal volume: 0.590 L) connected to the CSTR, a second polymerization stage (reaction time: 72 minutes) was performed under conditions of a temperature of 281° C. and a pressure of 25 bar.

After completion of the polymerization, a product was depressurized at 200° C. for 30 minutes to recover a polymerized petroleum resin.

The polymerized petroleum resin was fed into a fixed bed reactor with a length of 1.5 m, which was packed with a heterogeneous palladium catalyst (0.5%), and hydrogenation was performed three times under conditions of a reaction temperature of 250° C., a reaction pressure of 100 bar, a raw material flow rate of 40 ml/min, and a hydrogen flow rate of 4 NLPM to prepare a hydrogenated petroleum resin.

Preparation Example 7

A hydrogenated petroleum resin was prepared in the same manner as in Preparation Example 6, except that hydrogenation was performed a total of four times by further performing the hydrogenation once in Preparation Example 6.

Preparation Example 8

A monomer composition was prepared by mixing 900 g of dicyclopentadiene and 900 g of styrene in 1200 g of a xylene solvent.

While the monomer composition was continuously fed into a CSTR (internal volume: 0.416 L), a first polymerization stage (reaction time: 48 minutes) was performed under conditions of a temperature of 260° C. and a pressure of 25 bar.

While reaction products of the first polymerization stage were continuously fed into a PFR (internal volume: 0.590 L) connected to the CSTR, a second polymerization stage (reaction time: 72 minutes) was performed under conditions of a temperature of 281° C. and a pressure of 25 bar.

After completion of the polymerization, a product was depressurized at 200° C. for 30 minutes to recover a polymerized petroleum resin.

The polymerized petroleum resin was fed into a fixed bed reactor with a length of 1.5 m, which was packed with a heterogeneous palladium catalyst (0.5%), and hydrogenation was performed three times under conditions of a reaction temperature of 250° C., a reaction pressure of 100 bar, a raw material flow rate of 40 ml/min, and a hydrogen flow rate of 4 NLPM to prepare a hydrogenated petroleum resin.

Preparation Example 9

A hydrogenated petroleum resin was prepared in the same manner as in Preparation Example 8, except that hydrogenation was performed a total of four times by further performing the hydrogenation once in Preparation Example 8.

Comparative Example 1

A monomer composition was prepared by mixing 1500 g of dicyclopentadiene in 1500 g of a xylene solvent.

While the monomer composition was continuously fed into a CSTR (internal volume: 0.416 L, a first polymerization stage (reaction time: 34 minutes) was performed under conditions of a temperature of 260° C. and a pressure of 25 bar.

While reaction products of the first polymerization stage were continuously fed into a PER (internal volume: 0.590 L) connected to the CSTR, a second polymerization stage (reaction time: 51 minutes) was performed under conditions of a temperature of 275° C. and a pressure of 25 bar.

After completion of the polymerization, a product was depressurized at 200° C. for 30 minutes to recover a polymerized petroleum resin.

The reaction conditions of Preparation Examples and Comparative Preparation Examples are summarized in Table 1 below.

TABLE 1

| | Petroleum resin monomer | Petroleum resin polymerization conditions | Number of hydrogenation | Hydrogenation rate (%) |
|---|---|---|---|---|
| Preparation Example 1 | DCPD:styrene = 4.5:0.5 | CSTR 260° C., PFR 278° C. | Once | 81.5 |
| Preparation Example 2 | DCPD:styrene = 4.5:0.5 | CSTR 260° C., PFR 278° C. | Twice | 93.4 |
| Preparation Example 3 | DCPD:styrene = 4.5:0.5 | CSTR 260° C., PFR 278° C. | Three times | 96.1 |
| Preparation Example 4 | DCPD:styrene = 3.5:1.5 | CSTR 260° C., PFR 281° C. | Twice | 91.6 |
| Preparation Example 5 | DCPD:styrene = 3.5:1.5 | CSTR 260° C., PFR 281° C. | Three times | 96.4 |
| Preparation Example 6 | DCPD:styrene = 3.6:2.4 | CSTR 260° C., PFR 281° C. | Three times | 96.0 |
| Preparation Example 7 | DCPD:styrene = 3.6:2.4 | CSTR 260° C., PFR 281° C. | Four times | 97.2 |
| Preparation Example 8 | DCPD:styrene = 3:3 | CSTR 260° C., PFR 281° C. | Three times | 95.7 |
| Preparation Example 9 | DCPD:styrene = 3:3 | CSTR 260° C., PFR 281° C. | Four times | 96.9 |
| Comparative Preparation Example 1 | Only DCPD | CSTR 260° C., PFR 275° C. | Twice | 0 |

Examples of Preparation of Resin Composition for Tackifier or Adhesive

Example 1-1

25 g of the hydrogenated petroleum resin of Preparation Example 1 was mixed with 25 g of AFFINITY GA 1950 (Dow chemical) which is a PE-based metallocene polyolefin to prepare a resin composition for a tackifier or an adhesive.

Examples 2-1 to 9-1 and Comparative Example 1-1

Each resin composition for a tackifier or an adhesive was prepared in the same manner as in Example 1-1, except that each of the hydrogenated petroleum resins of Preparation Examples 1 to 9 and Comparative Preparation Example 1 was used instead of the hydrogenated petroleum resin of Preparation Example 1.

Example 1-2

25 g of the hydrogenated petroleum resin of Preparation Example 1 was mixed with 25 g of VISTAMAXX 8380 (Exxon mobile) which is a PP-based metallocene polyolefin to prepare a resin composition for a tackifier or an adhesive.

Examples 2-2 to 9-2 and Comparative Example 1-2

Each resin composition for a tackifier or an adhesive was prepared in the same manner as in Example 1-2, except that each of the hydrogenated petroleum resins of Preparation Examples 1 to 9 and Comparative Preparation Example 1 was used instead of the hydrogenated petroleum resin of Preparation Example 1.

Experimental Example

Evaluation of Physical Properties of Resins

Physical properties of the petroleum resins or the resin compositions for a tackifier or an adhesive prepared in Examples and Comparative Examples were measured by the following methods.

(1) Hydrogenation Rate

The number of moles of the total aromatic double bonds of the petroleum resin before hydrogenation and the number of moles of saturated aliphatic single bonds in the aromatic double bonds of the hydrogenated petroleum resin after hydrogenation were determined as a ratio (area, %) of each bond by using $^1$H-NMR, and the hydrogenation rate was calculated according to the following Equation 1 below.

Hydrogenation rate (%)=Number of moles of saturated aliphatic single bonds in aromatic double bonds of hydrogenated petroleum resin after hydrogenation/Number of moles of total aromatic double bonds in petroleum resin before hydrogenation*100   [Equation 1]

(2) Light Transmittance

Each resin composition for a tackifier or an adhesive was prepared as a 2 mm-thick specimen under conditions of 170° C., 10 MPa, and 5 minutes using a hot press (Qmesys QM900A). The transmittance of the specimen was measured using BYC's Haze-gard plus equipment.

(3) Measurement of Peel Strength

Each resin composition for a tackifier or an adhesive was adhered to the corona surface-treated 100-μm PET film using Qmesys's hot press QM900A. The sample was cut to 2.5 cm×10.0 cm, and peel strength was measured at a rate of 100 mm/min using a LLOYD's FT-1 universal testing machine.

The results of evaluating the physical properties of Examples and Comparative Examples are summarized in Tables 2 and 3 below, respectively.

TABLE 2

| Preparation Example of hydrogenated petroleum resin | | Content of C9 monomer* | Hydrogenation rate (%) | Light transmittance (%) | Peel strength (kgf/25 mm) |
| --- | --- | --- | --- | --- | --- |
| Example 2-1 | Preparation Example 2 | 10 wt % | 93.4 | 90 | 0.43 |
| Example 3-1 | Preparation Example 3 | 10 wt % | 96.1 | 86 | 0.61 |
| Example 4-1 | Preparation Example 4 | 30 wt % | 91.6 | 88 | 0.66 |
| Example 5-1 | Preparation Example 5 | 30 wt % | 96.4 | 87 | 0.48 |
| Example 6-1 | Preparation Example 6 | 40 wt % | 96.0 | 85 | 1.13 |
| Example 7-1 | Preparation Example 7 | 40 wt % | 97.2 | 87 | 0.44 |
| Comparative Example 1-1 | Comparative Preparation Example 1 | 0 wt % | 0 | 82 | 1.40 |

TABLE 3

| Preparation Example of hydrogenated petroleum resin | | Content of C9 monomer* | Hydrogenation rate (%) | Light transmittance (%) | Peel strength (kgf/25 mm) |
| --- | --- | --- | --- | --- | --- |
| Example 5-2 | Preparation Example 5 | 30 wt % | 96.4 | 90 | 0.09 |
| Example 6-2 | Preparation Example 6 | 40 wt % | 96.0 | 91 | 1.48 |
| Example 7-2 | Preparation Example 7 | 40 wt % | 97.2 | 91 | 3.88 |
| Example 8-2 | Preparation Example 8 | 50 wt % | 95.7 | 91 | 3.81 |
| Example 9-2 | Preparation Example 9 | 50 wt % | 96.9 | 91 | 3.42 |
| Comparative Example 1-2 | Comparative Preparation Example 1 | 0 wt % | 0 | 84 | 0.04 |

*The content of C9 monomer means the content (wt %) of C9 monomer, based on the total weight of dicyclopentadiene and C9 monomer in the petroleum resin.

What is claimed is:

1. A resin composition for a tackifier or an adhesive, the resin composition comprising:
    a hydrogenated petroleum resin obtained by performing thermal polymerization and hydrogenation of a monomer composition including dicyclopentadiene and C9 monomer; and
    a metallocene polyolefin,
    wherein the metallocene polyolefin is a polyethylene (PE)-based polyolefin,
    wherein the hydrogenated petroleum resin includes the C9 monomer in an amount of 5 to 40 wt %, based on the total weight of the dicyclopentadiene and the C9 monomer, and the metallocene polyolefin is a metallocene polyethylene (PE)-based polyolefin,
    wherein the hydrogenated petroleum resin has a hydrogenation rate of 90% to 100%, as measured by the following Equation 1:

Hydrogenation rate (%)=Number of moles of saturated aliphatic single bonds from aromatic double bonds in hydrogenated petroleum resin after hydrogenation/Number of moles of total aromatic double bonds in petroleum resin before hydrogenation*100.  [Equation 1]

2. The resin composition for a tackifier or an adhesive of claim 1, wherein the C9 monomer includes styrene, alpha methyl styrene, vinyl toluene, indene, or alkylated derivatives thereof.

3. The resin composition for a tackifier or an adhesive of claim 1, wherein the hydrogenated petroleum resin and the metallocene polyolefin are included at a weight ratio of 60:40 to 40:60.

4. A method of preparing a resin composition for a tackifier or an adhesive, the method comprising the steps of:
    preparing a polymerized petroleum resin by performing thermal polymerization of a monomer composition including dicyclopentadiene and C9 monomer;
    preparing a hydrogenated petroleum resin having a hydrogenation rate of 90% to 100%, as measured by the following Equation 1, by performing hydrogenation of the polymerized petroleum resin; and
    mixing the hydrogenated petroleum resin and a metallocene polyolefin,
    wherein the metallocene polyolefin is a polyethylene (PE)-based polyolefin,
    wherein the hydrogenated petroleum resin includes the C9 monomer in an amount of 5 to 40 wt %, based on the total weight of the dicyclopentadiene and the C9 monomer, and the metallocene polyolefin is a metallocene polyethylene (PE)-based polyolefin:

Hydrogenation rate (%)=Number of moles of saturated aliphatic single bonds from aromatic double bonds in hydrogenated petroleum resin after hydrogenation/Number of moles of total aromatic double bonds in petroleum resin before hydrogenation*100.  [Equation 1]

5. The method of preparing a resin composition for a tackifier or an adhesive of claim 4, wherein the C9 monomer includes styrene, alpha methyl styrene, vinyl toluene, indene, or alkylated derivatives thereof.

6. The method of preparing a resin composition for a tackifier or an adhesive of claim 4, wherein the step of performing thermal polymerization includes a first polymerization stage of performing a polymerization process of the monomer composition under stirring; and a second polymerization stage of performing a polymerization process of the reaction product of the first stage polymerization without stirring.

7. The method of preparing a resin composition for a tackifier or an adhesive of claim 6, wherein the first polymerization stage is performed in a continuous stirred tank reactor (CSTR), and the second polymerization stage is performed in a plug flow reactor (PFR).

8. A hot melt tackifier or adhesive comprising the resin composition for a tackifier or an adhesive of claim 1.

* * * * *